(12) United States Patent
Chen et al.

(10) Patent No.: US 8,462,494 B2
(45) Date of Patent: Jun. 11, 2013

(54) PANEL FIXING MECHANISM AND DISPLAYING DEVICE THEREOF

(75) Inventors: Ta-Wei Chen, Taipei Hsien (TW); Chia-Hsin Hsieh, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 305 days.

(21) Appl. No.: 12/898,669

(22) Filed: Oct. 5, 2010

(65) Prior Publication Data

US 2012/0063067 A1    Mar. 15, 2012

(30) Foreign Application Priority Data

Sep. 9, 2010    (TW) .............................. 99130464 A

(51) Int. Cl.
*H05K 5/00* (2006.01)
*H05K 7/00* (2006.01)
*G06F 1/16* (2006.01)

(52) U.S. Cl.
USPC ............. 361/679.41; 361/679.3; 361/679.43; 361/679.56

(58) Field of Classification Search
USPC ............... 361/679.3, 679.41, 679.43, 679.56; 455/575.1, 575.4
See application file for complete search history.

(56) References Cited

U.S. PATENT DOCUMENTS

| | | | | |
|---|---|---|---|---|
| 6,532,152 | B1 * | 3/2003 | White et al. | 361/692 |
| 7,800,897 | B2 * | 9/2010 | Hung | 361/679.41 |
| 2011/0054268 | A1 * | 3/2011 | Fidacaro et al. | 600/300 |

FOREIGN PATENT DOCUMENTS

CN    101271349 A    9/2008

OTHER PUBLICATIONS

Office action mailed on Feb. 25, 2013 for the China application No. 201010284170.9, p. 3 line 2~13, line 15~18, line 20~23, line 25~31, line 33~35 and line 37~45, p. 4 line 1~7, line 9~14, line 16~22, line 24~26 and line 28~30 and p. 5.

* cited by examiner

*Primary Examiner* — Anthony Haughton
(74) *Attorney, Agent, or Firm* — Winston Hsu; Scott Margo

(57) ABSTRACT

A panel fixing mechanism includes a supporting component for supporting a side of a panel, a positioning structure passing through the supporting component for engaging inside a hole on the panel so as to guide a connector to insert into a socket of the panel, and a hook structure for supporting another side of the panel and wedging into a slot on the panel in a movable manner.

11 Claims, 6 Drawing Sheets

PANEL FIXING MECHANISM AND DISPLAYING DEVICE THEREOF

BACKGROUND OF THE INVENTION

1. Field of the Invention

The present invention relates to a panel fixing mechanism, and more particularly, to a panel fixing mechanism for fixing a panel in a movable manner and a displaying device thereof.

2. Description of the Prior Art

All in one PC becomes a trend in a computer market. Generally, a panel is screwed on a supporting base with a conventional assembly method, which is complicated and utilizes numbers of screws. Therefore, the conventional assembly method spends labor hours and increases manufacturing cost.

Conventional tablet computers include three main types, such as a dual-utilization type, a tablet type, and a tri-utilization type. The dual-utilization type computer is similar to a common notebook computer. Electronic components, such as a processor, and a keyboard module are disposed inside a lower casing of the dual-utilization type computer. A panel of the dual-utilization type computer can be rotated to fold on the keyboard module, so that the dual-utilization type computer can be utilized as the tablet computer. Therefore, the dual-utilization type computer can be switched to different operating modes according to a user's demand. The tablet type computer and the tri-utilization type computer dispose the panel and the electronic components, such as a processor, inside the casing together, so that appearances of the tablet type computer and the tri-utilization type computer are similar to a portable handwriting electronic panel. For example, the tri-utilization type computer can be installed on a detachable keyboard, the tablet type computer can be installed on a wireless keyboard, and the tablet type computer and the tri-utilization type computer can be respectively disposed on corresponding supporting devices for standing on a base as the conventional desktop computer. However, screws are utilized to fix the tablet computer on a frame of the supporting device, which is operated complicatedly and inconvenient. Thus, design of a supporting mechanism with easy operation and preferable fixing function is an important issue of the electronic industry.

SUMMARY OF THE INVENTION

The present invention provides a panel fixing mechanism of fixing a panel in a movable manner and a related displaying device for solving above drawbacks.

According to the claimed invention, a panel fixing mechanism includes a supporting component for supporting a side of a panel, a positioning structure passing through the supporting component for engaging inside at least one fixing hole on the panel so as to guide a connector to insert into a socket on the panel, and a hook structure wedged inside a slot on the panel in a movable manner for supporting the other side of the panel.

According to the claimed invention, the hook structure includes a base, and a hook disposed on the base. A guiding inclined surface is formed on the hook for guiding the hook to wedge inside the slot on the panel.

According to the claimed invention, the panel fixing mechanism further includes a resilient component connected to the base for being resiliently deformed when the guiding inclined surface is pressed and for driving the hook to wedge inside the slot on the panel.

According to the claimed invention, the positioning structure includes two positioning pins disposed on two sides of the connector for respectively inserting into the two fixing holes on the panel.

According to the claimed invention, each positioning pin is made of metal material.

According to the claimed invention, a displaying device includes a panel whereon at least one fixing hole, a socket, and a slot are formed, and a frame for supporting the panel. The frame includes a front rim and a holding stand. The displaying device further includes a connector for electrically connecting to the panel when the panel is disposed on the frame so as to transmit an electrical signal, and a panel fixing mechanism for fixing the panel on the frame. The panel fixing mechanism includes a supporting component for supporting a side of a panel, a positioning structure passing through the supporting component for engaging inside at least one fixing hole on the panel so as to guide a connector to insert into a socket on the panel, and a hook structure wedged inside a slot on the panel in a movable manner for supporting the other side of the panel.

According to the claimed invention, the present invention utilizes the supporting component, the positioning structure, and the hook structure to fix the panel on the frame by three-point fixing assembly. The user can press the hook structure for installing the panel on the panel fixing mechanism rapidly and conveniently without tools.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
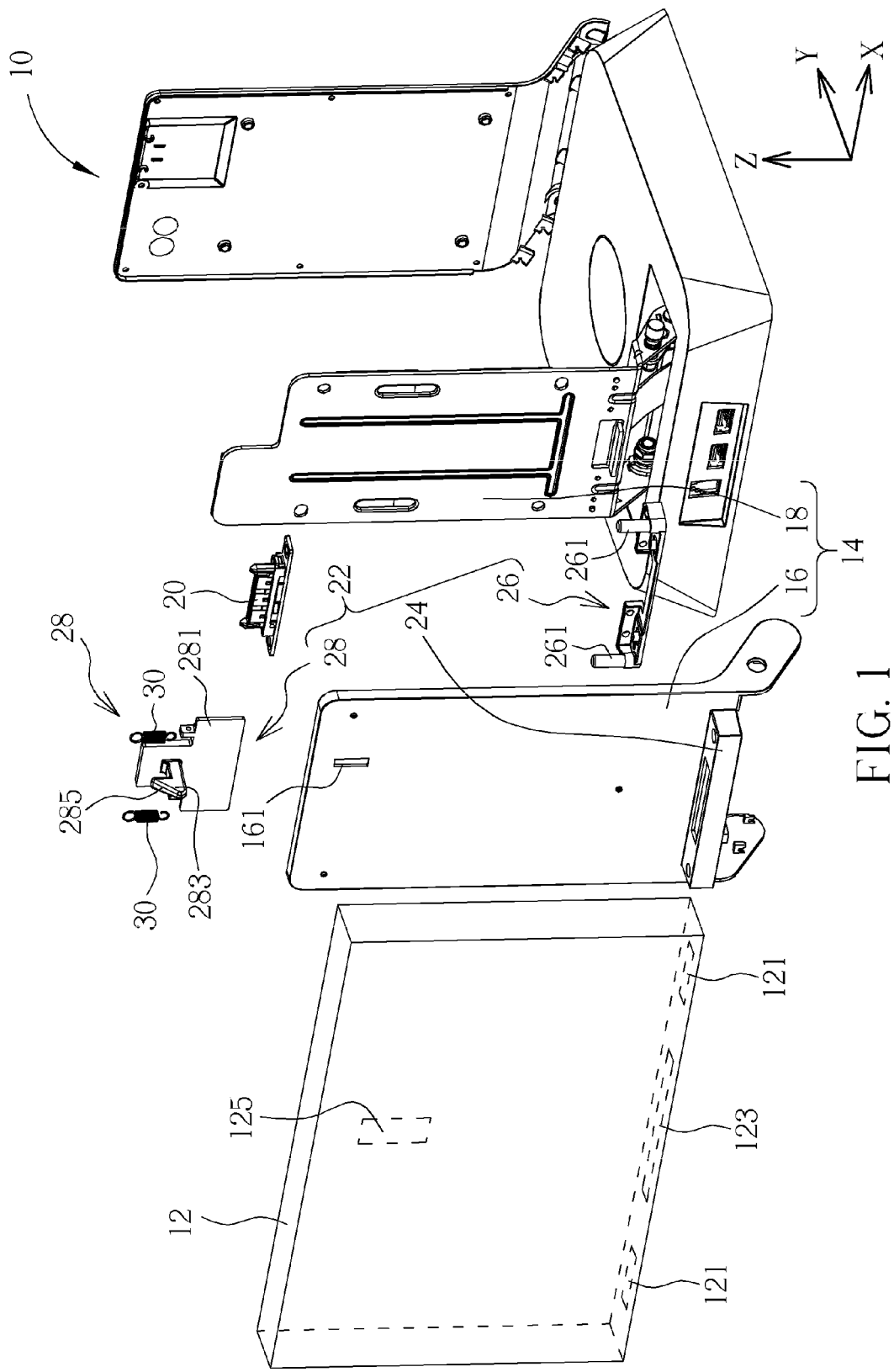
FIG. 1 is an exploded diagram of a displaying device according to a preferred embodiment of the present invention.
Figure 2:
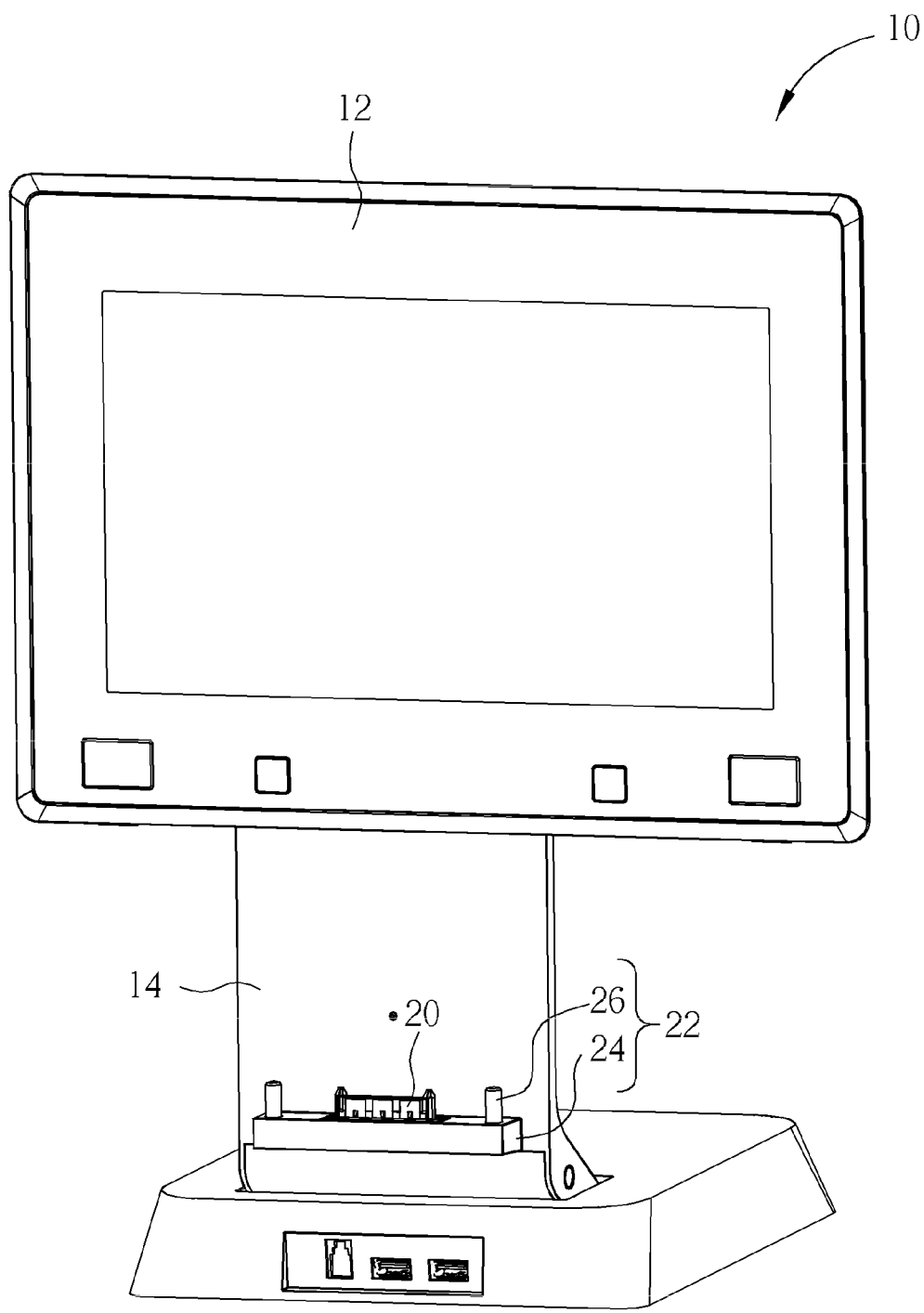
FIG. 2 is an assembly diagram of the displaying device according to the preferred embodiment of the present invention.
Figure 3:
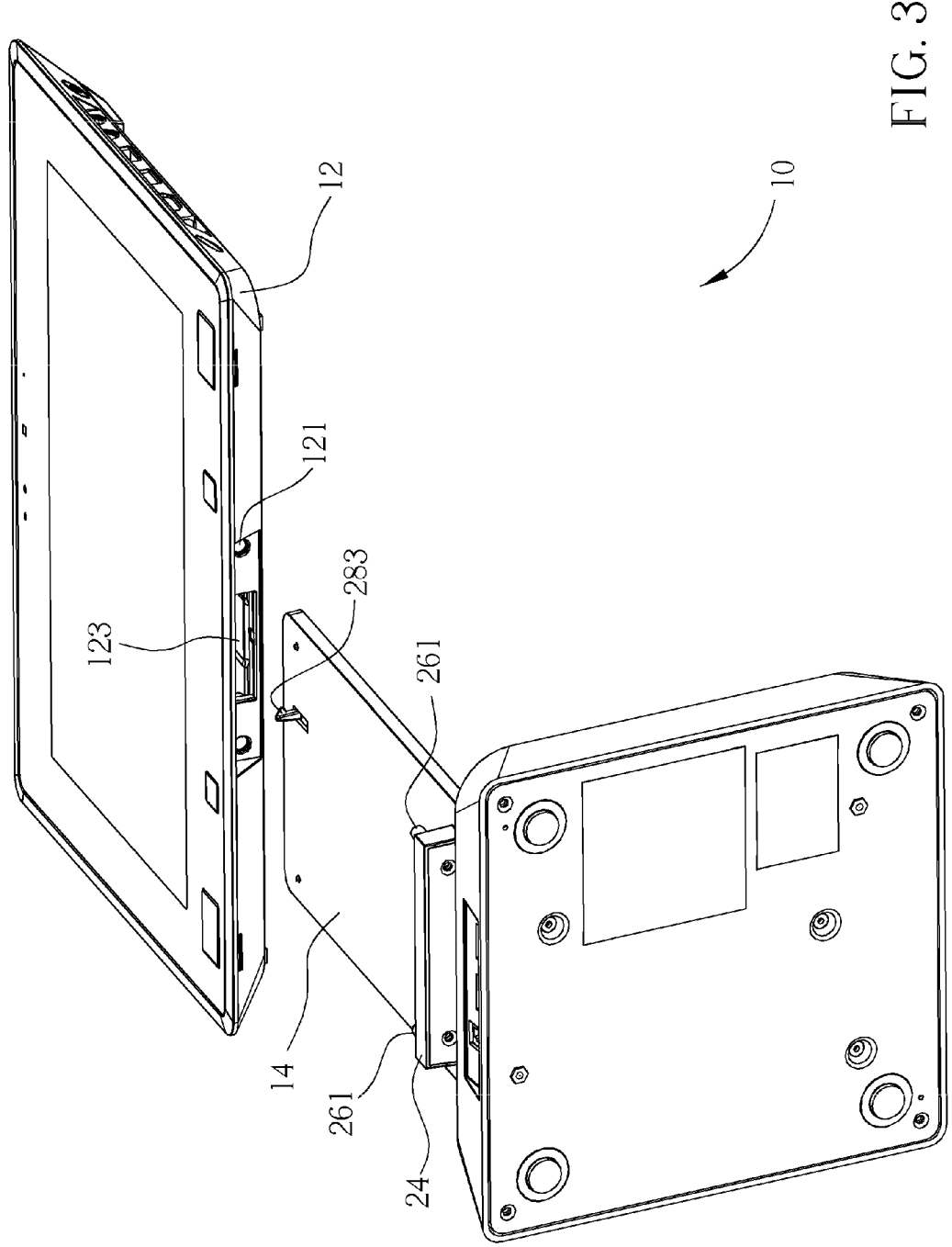
FIG. 3 is a diagram of the displaying device in another view according to the preferred embodiment of the present invention.

Please refer to FIG. 1 to FIG. 3. FIG. 1 is an exploded diagram of a displaying device 10 according to a preferred embodiment of the present invention. FIG. 2 is an assembly diagram of the displaying device 10 according to the preferred embodiment of the present invention. FIG. 3 is a diagram of the displaying device 10 in another view according to the preferred embodiment of the present invention. The displaying device 10 can be an all in one PC. The displaying device 10 includes a panel 12. The panel 12 includes two fixing holes, a socket 123, and a slot 125. The panel 12 can be a tablet computer, a liquid crystal display, and so on, which can be disposed on the displaying device 10 in a movable manner for convenient operation. The displaying device 10 further includes a frame 14 for supporting the panel 12. The frame 14 includes a front rim 16 and a holding stand 18. Generally, the front rim 16 can be made of plastic material, and the holding stand 18 can be made of metal material, such as iron material, for providing stable structural strength. The displaying device 10 further includes a connector 20 for electrically connecting to the panel 12 when the panel 12 is placed on the frame 14, so as to transmit signals between the panel 12 and a host. The displaying device 10 further includes a panel fixing mechanism 22 for fixing the panel 12 on the frame 14 by three-point fixing assembly. For example, two supporting points of the panel fixing mechanism 22 hold under the panel 12, and one fixing point of the panel fixing mechanism 22 fixes an upper side of the panel 12 for preventing the panel 12 from overturning.

The panel fixing mechanism 22 includes a supporting component 24 connected to the front rim 16 for supporting a side of the panel 12, and a positioning structure 26 passing through the supporting component 24. The positioning structure 26 can include two positioning pins 261 respectively disposed on two sides of the connector 20 for inserting into two fixing holes 121 on the panel 12, so as to guide the connector 20 to insert into the socket 123 on the panel 12 for electrical connection. The positioning pin 261 can be made of metal material, so as to provide preferable structural strength. The panel fixing mechanism 22 further includes a hook structure 28 passing through a hole 161 formed on the front rim 16 in a movable manner, so as to wedge inside the slot 125 on the panel 12 for fixing an upper side of the panel 12 and for preventing the panel 12 from overturning and separating from the frame 14, as shown in FIG. 2. The hook structure 28 can include a base 281, and a hook 283 disposed on the base 281. The hook 283 can be made of polyacetal (POM) material for low cost. A guiding inclined surface 285 can be formed on the hook 283 for guiding the hook 283 to wedge inside the slot 125 on the panel 12. In addition, the panel fixing mechanism 22 can further include a resilient component 30 connected to the base 281 of the hook structure 28 for being resiliently deformed when the guiding inclined surface 285 is pressed and for driving the hook 283 to wedge inside the slot 125 on the panel 12.

Figure 4:
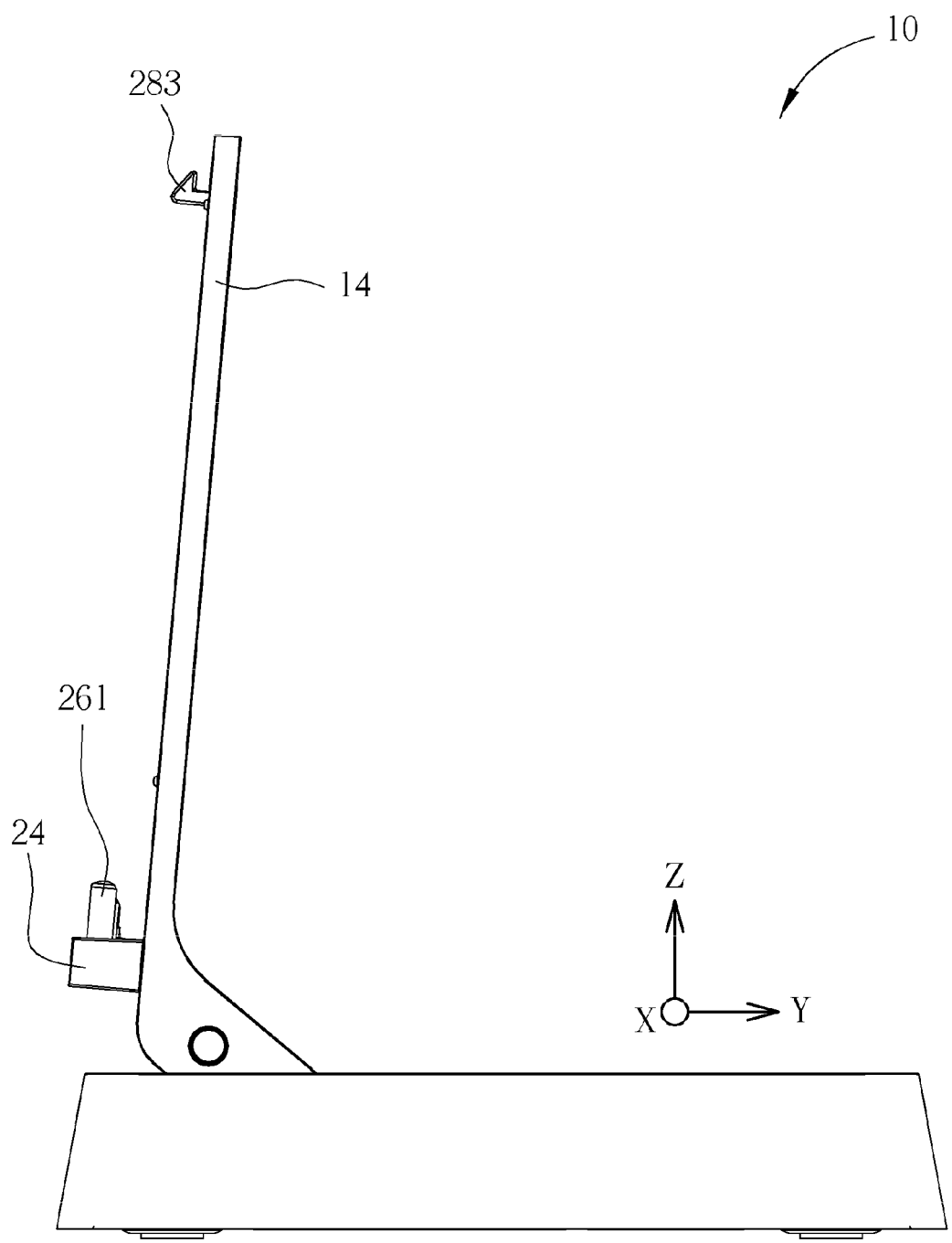
FIG. 4 is a lateral view of the displaying device without a panel according to the preferred embodiment of the present invention.
Figure 5:
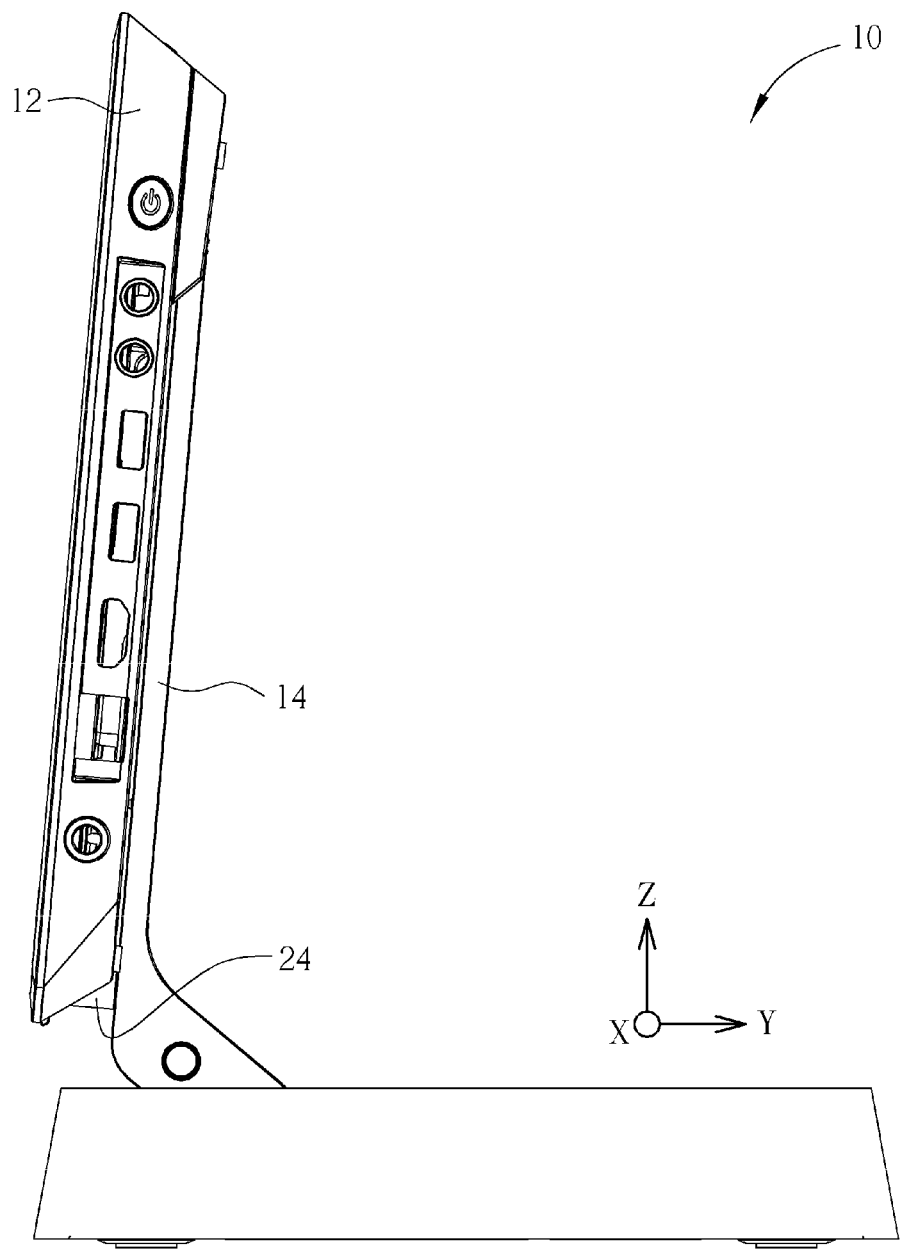
FIG. 5 is a lateral view of the panel placed on a frame according to the preferred embodiment of the present invention.

Please refer to FIG. 4 and FIG. 5. FIG. 4 is a lateral view of the displaying device 10 without the panel 12 according to the preferred embodiment of the present invention. FIG. 5 is a lateral view of the panel 12 placed on the frame 14 according to the preferred embodiment of the present invention. As shown in FIG. 1, FIG. 4, and FIG. 5, the connector 20 can be disposed on the positioning structure 26 and placed between the two positioning pins 261 as assembling the displaying device 10. Then, the hook 283 passes through the hole 261, so that the hook structure 28 is disposed between the front rim 16 and the holding stand 18, and the two positioning pins 261 of the positioning structure 26 pass through the supporting component 24. Finally, the frame 14 is assembled by combining the front rim 16 with the holding stand 18, and the panel 12 can be placed on the frame 14, so as to fix a position of the panel 12 and to adjust a view angle of the panel 12 conveniently. The front rim 16 can be monolithically integrated with the supporting component 24.

Figure 6:
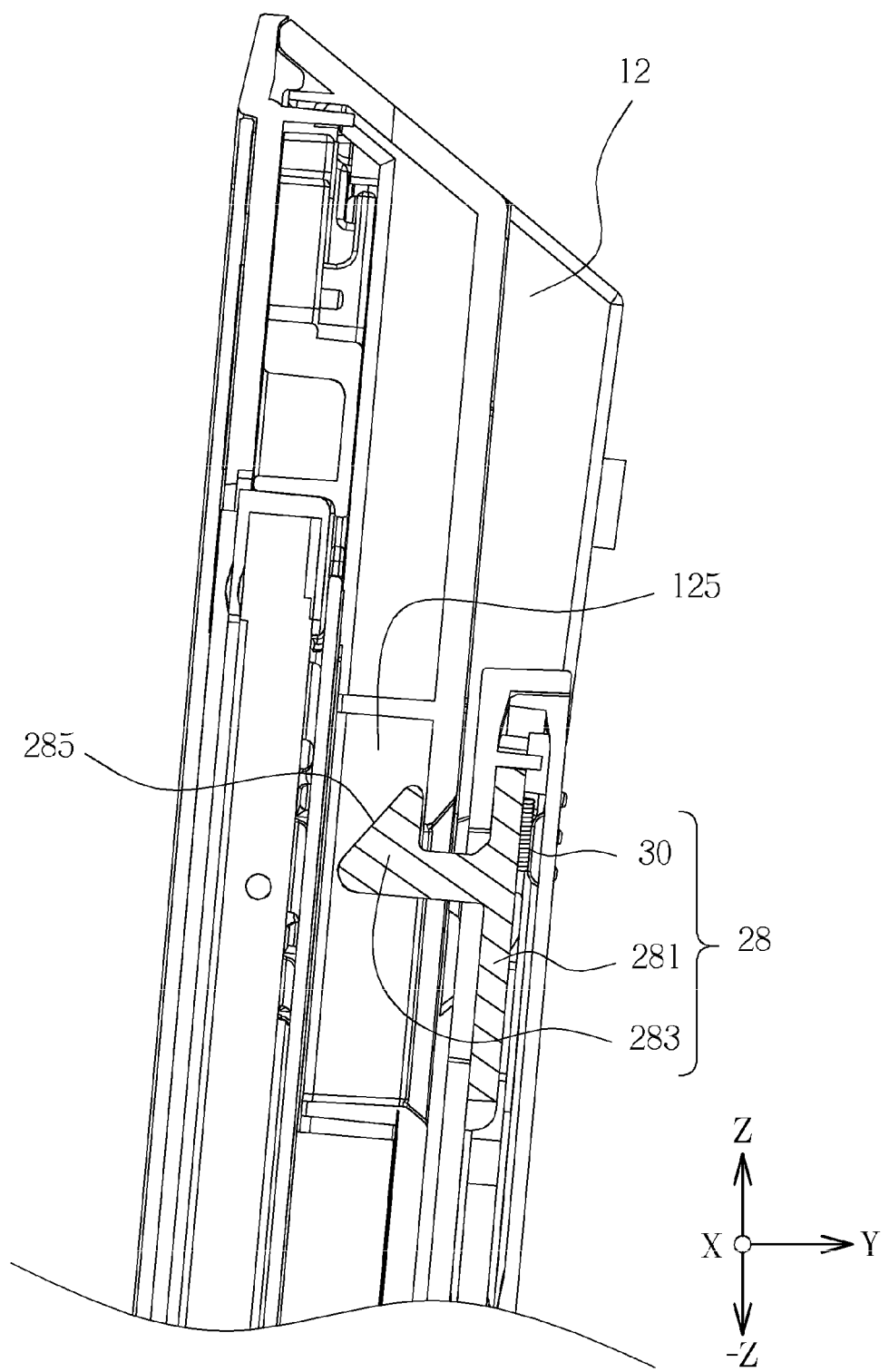
FIG. 6 is an enlarged sectional diagram of the panel placed on the frame according to the preferred embodiment of the present invention.

Please refer to FIG. 6. FIG. 6 is an enlarged sectional diagram of the panel 12 placed on the frame 14 according to the preferred embodiment of the present invention. As shown in FIG. 1 and FIG. 4 to FIG. 6, the two positioning pins 261 of the positioning structure 26 sheath into the two fixing holes 121 on the panel 12 along −Z direction for assembling the panel 12 on the frame 14. Meanwhile, the connector 20 is inserted into the socket 123 on the panel 12 via the positioning pins 261, so as to transmit signals of the panel 12. Then, the panel 12 falls toward the frame 14 along +Y direction by its gravity, and the user can press the panel 12 along +Y direction, so as to press the guiding inclined surface 285 to drive the hook 283 to move along −Z direction. When the hook 283 is accommodated inside the slot 125, the resilient force of the resilient component 30 drives the hook 283 to move back to an initial position along +Z direction, so that the panel 12 can be wedged on the hook structure 28 stably. In addition, the hook 283 also can be moved along −Z direction manually. When the hook 283 is accommodated inside the slot 125 on the panel 12, the resilient force of the resilient component 30 drives the hook 283 to move back to the initial position, therefore, the panel 12 can be wedged on the hook structure 28 stably, and the two positioning pins 261 and the hook 283 can constrain movements of the panel 12 at X direction and Y direction by three-point fixing assembly. On the other hand, the panel 12 can be separated from the panel fixing mechanism 22 rapidly by moving the panel 12 along +Z direction.

Comparing to the prior art, the present invention utilizes the supporting component, the positioning structure, and the hook structure to fix the panel on the frame by three-point fixing assembly. The user can press the hook structure for installing the panel on the panel fixing mechanism rapidly and conveniently without tools. In addition, the panel can be separated from the panel fixing mechanism by lifting the panel up, so that the panel fixing mechanism of the present invention has easy operation.

Those skilled in the art will readily observe that numerous modifications and alterations of the device and method may be made while retaining the teachings of the invention.

What is claimed is:

1. A panel fixing mechanism comprising:
   a supporting component connected to a bottom of a front rim for supporting a low side of a panel;
   a positioning structure passing through the supporting component for engaging inside at least one fixing hole formed on the low side of the panel so as to guide a connector to insert into a socket on the panel; and
   a hook structure disposed on a top of the front rim and wedged inside a slot on the panel in a movable manner for hooking an upper side of the panel upwardly to provide an upward force to the upper side of the panel, so as to support a weight of the panel with the supporting component.

2. The panel fixing mechanism of claim 1, wherein the hook structure comprises:
   a base; and
   a hook disposed on the base, a guiding inclined surface being formed on the hook for guiding the hook to wedge inside the slot on the panel.

3. The panel fixing mechanism of claim 2 further comprising:
   a resilient component connected to the base for being resiliently deformed when the guiding inclined surface is pressed and for driving the hook to wedge inside the slot on the panel.

4. The panel fixing mechanism of claim 1, wherein the positioning structure comprises two positioning pins disposed on two sides of the connector for respectively inserting into the two fixing holes on the panel.

5. The panel fixing mechanism of claim 4, wherein each positioning pin is made of metal material.

6. A displaying device comprising:
   a panel whereon at least one fixing hole, a socket, and a slot are formed, wherein the at least one fixing hole and the socket are formed on a low side of the panel, and the slot is formed on an upper side of the panel;

a frame for supporting the upper side of the panel, the frame comprising a front rim and a holding stand;

a connector for electrically connecting to the panel when the panel is disposed on the frame so as to transmit an electrical signal; and a panel fixing mechanism for fixing the panel on the frame, the panel fixing mechanism comprising:

a supporting component connected to a bottom of the front rim for supporting the low side of the panel;

a positioning structure passing through the supporting component for engaging inside the at least one fixing hole on the panel so as to guide the connector to insert into the socket on the panel; and a hook structure disposed on a top of the front rim and wedged inside the slot on the panel in a movable manner for hooking the upper side of the panel upwardly to provide an upward force to the upper side of the panel, so as to support a weight of the panel with the supporting component.

7. The displaying device of claim 6, wherein the hook structure comprises:

a base; and a hook disposed on the base, a guiding inclined surface being formed on the hook for guiding the hook to wedge inside the slot on the panel.

8. The displaying device of claim 6, wherein the panel fixing mechanism further comprises:

a resilient component connected to the base for being resiliently deformed when the guiding inclined surface is pressed and for driving the hook to wedge inside the slot on the panel.

9. The displaying device of claim 6, wherein the positioning structure comprises two positioning pins disposed on two sides of the connector for respectively inserting into the two fixing holes on the panel.

10. The displaying device of claim 9, wherein each positioning pin is made of metal material.

11. The displaying device of claim 6, wherein a hole is formed on the front rim, and the hook passes through the hole in a movable manner for wedging inside the slot on the panel.

* * * * *